United States Patent
Li

(10) Patent No.: US 8,626,345 B2
(45) Date of Patent: Jan. 7, 2014

(54) METHOD AND SYSTEM FOR OPTIMAL COORDINATION CONTROL AND SOFT REPAIR OF MULTIPLE ROOFTOP HEATING AND COOLING UNITS

(75) Inventor: Haorong Li, Omaha, NE (US)

(73) Assignee: Nutech Ventures, Inc., Lincoln, NE (US)

( * ) Notice: Subject to any disclaimer, the term of this patent is extended or adjusted under 35 U.S.C. 154(b) by 265 days.

(21) Appl. No.: 12/844,062

(22) Filed: Jul. 27, 2010

(65) Prior Publication Data
US 2011/0022235 A1 Jan. 27, 2011

Related U.S. Application Data

(60) Provisional application No. 61/228,674, filed on Jul. 27, 2009.

(51) Int. Cl.
*G05D 23/19* (2006.01)

(52) U.S. Cl.
USPC ............. 700/277; 700/276; 62/126; 165/257; 236/51; 236/49.3

(58) Field of Classification Search
USPC ....... 700/277, 276; 62/126; 165/257; 236/51, 236/49.3
See application file for complete search history.

(56) References Cited

U.S. PATENT DOCUMENTS

| | | | | |
|---|---|---|---|---|
| 5,385,297 A | * | 1/1995 | Rein et al. | 236/49.3 |
| 5,711,480 A | * | 1/1998 | Zepke et al. | 236/51 |
| 5,769,314 A | * | 6/1998 | Drees et al. | 236/49.3 |
| 2008/0208392 A1 | * | 8/2008 | Hudson | 700/276 |

* cited by examiner

*Primary Examiner* — Tejal Gami
(74) *Attorney, Agent, or Firm* — Advent, LLP

(57) ABSTRACT

Techniques are described that may be implemented in an adaptive control device to regulate multiple zone environmental units based upon multiple temperature values and multiple airflow values, where each temperature value and each airflow value is related to the temperature and the airflow in a specific zone. In an implementation, the input interface of the adaptive control device is configured to receive multiple temperature values and multiple air flow values from multiple zone sensors. The adaptive control device may calculate multiple operational values based on the multiple temperature values and the multiple air flow values. An operational value indicates a power state (e.g. power on/power off) for a zone environmental unit's fan, compressor, heater, exhaust fan, and damper. The adaptive control device's output interface is operable to transmit multiple sequencing commands to the plurality of zone environmental units.

14 Claims, 3 Drawing Sheets

METHOD AND SYSTEM FOR OPTIMAL COORDINATION CONTROL AND SOFT REPAIR OF MULTIPLE ROOFTOP HEATING AND COOLING UNITS

CROSS-REFERENCE TO RELATED APPLICATIONS

The present application claims the benefit under 35 U.S.C. §119(e) of U.S. Provisional Application Ser. No. 61/228,674, filed Jul. 27, 2009, which is herein incorporated by reference in its entirety.

BACKGROUND

Multi-Roof Top Units (RTUs) are generally used for light commercial buildings with an open space. RTUs are configured as constant air volume systems, which causes these RTUs to be inefficient in ventilation, capacity, and humidity control.

SUMMARY

Techniques are described that may be implemented in an adaptive control device to regulate multiple zone environmental units (RTUs) based upon multiple temperature values and multiple airflow values, where each temperature value and each airflow value is related to the temperature and the airflow in a specific zone. In an implementation, the input interface of the adaptive control device is configured to receive multiple temperature values and multiple air flow values from multiple zone sensors. The adaptive control device may calculate multiple operational values based on the multiple temperature values and the multiple air flow values. An operational value indicates a power state (e.g. power on/power off) for a zone environmental unit's fan, compressor, heater, exhaust fan, and damper. The adaptive control device's output interface is operable to transmit multiple sequencing commands to the plurality of zone environmental units.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Zone environmental units, or Heating, Venting, and Air Conditioning systems (i.e. roof top units), are generally constant air systems, which causes these zone environmental units to be inefficient regulating humidity and ventilation.

Accordingly, techniques are described that may be implemented in an adaptive control device that provides sequencing commands to multiple zone environmental units. In an implementation, the adaptive control device's input interface may receive multiple temperature values and multiple airflow values from a plurality of zone sensors. The zone sensors may be dedicated to a specific zone within an enclosed structure. The adaptive control device may then calculate multiple operational values based on the received temperature values and airflow values. An operational value may indicate or signify a power state of a zone environmental unit's fan, compressor, heater, exhaust fan, and/or one or more coupled dampers. The adaptive control device's output interface may transmit multiple sequencing commands to the appropriate zone environmental units for sequencing the fans, compressors, heaters, exhaust fans, and dampers. The sequencing commands may be based on the calculated operation values.

For example, an adaptive control device may receive temperature values and airflow values from two zone sensors; one zone sensor dedicated to a first zone in an enclosed structure and the other zone sensor dedicated to a second zone (distinct from the first zone) in the enclosed structure. The adaptive control device may then calculate operational values, based on the temperature values and airflow values from each respective zone, to determine whether the zone environmental units associated with these two zones should be powered on or powered off. The adaptive control device may then transmit a first sequencing command to the zone environmental unit dedicated to the first zone based on the first operational value. This first operational value may be determined from temperature values and airflow values associated with the first zone. The adaptive control device may also transmit a second sequencing command to the zone environmental unit dedicated to the second zone based on the second operational value, where the second operational value may be determined from temperature values and airflow values associated with the second zone. Each operational value may indicate to power on/off the respective zone environmental unit's fan, compressor, heater, exhaust fan, and damper depending the temperature value and airflow value associated with each respective zone.

In the following discussion, an example adaptive control device environment is first described. Exemplary procedures are then described that may be employed with the example environment, as well as with other environments and devices without departing from the spirit and scope thereof.

Example Environment

Figure 1:
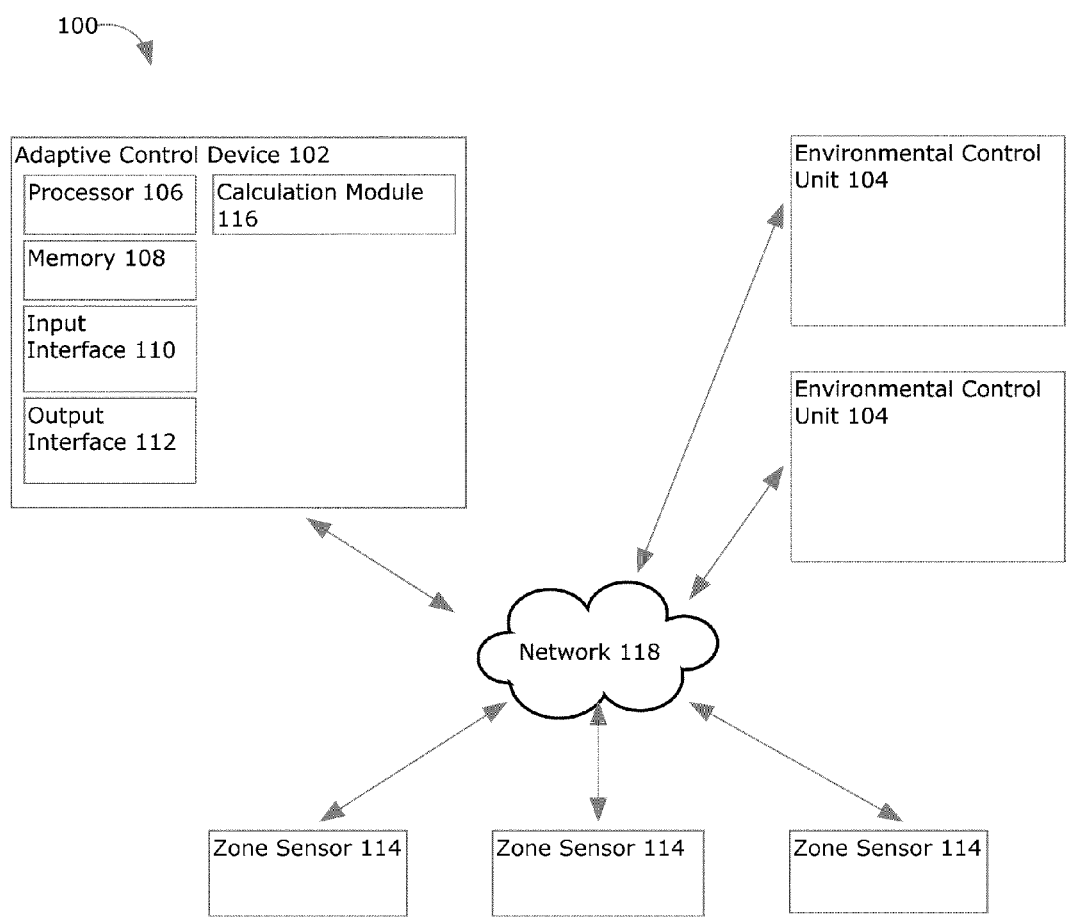
FIG. 1 is a schematic view of an adaptive controller.

FIG. 1 illustrates an example adaptive control device environment 100 that is operable to perform the techniques discussed herein. The environment 100 includes an adaptive control device 102 operable to sequence commands to multiple zone environmental units 104. The adaptive control device 102 may be configured in a variety of ways. For instance, an adaptive control device 102 may be configured as a central processing unit, a microcontroller with pre-programmed instructions, a stand-alone computing device, combinations thereof, and so forth. In the following description, a referenced component, such as a adaptive control device 102, may refer to one or more entities, and therefore by convention reference may be made to a single entity (e.g., the adaptive control device 102) or multiple entities (e.g., the mobile electronic devices 102, the plurality of mobile electronic devices 102, and so on) using the same reference number.

In FIG. 1, the adaptive control device 102 is illustrated as including a processor 106 and a memory 108. The processor 106 provides processing functionality for the adaptive control device 102 and may include any number of processors, microcontrollers, or other processing systems and resident or external memory for storing data and other information accessed or generated by the adaptive control device 102. The processor 106 may execute one or more software programs which implement the techniques and modules described herein. The processor 106 is not limited by the materials from which it is formed or the processing mechanisms employed therein and, as such, may be implemented via semiconductor(s) and/or transistors (e.g., electronic integrated circuits (ICs)), and so forth.

The memory 108 is an example of device-readable storage media that provides storage functionality to store various data associated with the operation of the adaptive control device 102, such as the software program and code segments mentioned above, or other data to instruct the processor 106 and other elements of the adaptive control device 102 to perform the techniques described herein. Although a single memory 108 is shown, a wide variety of types and combinations of memory may be employed. The memory 108 may be integral with the processor 106, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

FIG. 1 also illustrates the adaptive control device 102 as including an input interface 110 and an output interface 112. The input interface 110 may provide functionality to receive data via a network 118, and the output interface 112 may provide functionality to transmit data via the network 118. Embodiments of the input interface 110 and the output interface 112 may include, for example, a port, a cable, a wireless receiver, and so forth. The network 118 may include a wireless network, a wired network, the Internet, an intranet, and so forth.

The environment 100 also includes a plurality of zone sensors 114 as illustrated in FIG. 1. Each zone sensor 114 may be dedicated to a specific zone 202 (depicted in FIG. 2) to collect and/or to measure environmental characteristics of the specific zone 202. For example, a zone sensor 114 may measure the temperature and the airflow in a specific zone. The input interface 112 may then receive a temperature value and an airflow value from the zone sensor 114 via the network 118. Embodiments of the plurality of zone sensors 114 may include any generally known temperature/airflow sensor known in the art or the like.

The adaptive control device 102 is further illustrated as including functionality to provide sequencing commands to control the power state of a zone environmental unit 104 via a calculation module 116. For example, adaptive control device 102 may receive temperature values and airflow values via the input interface 110. The calculation module 116 may calculate a plurality of operational values utilizing a set of equations, as described below, to determine whether a plurality of zone environmental units 104 should be powered on if the zone environmental units 104 are currently in a powered down state or whether the zone environmental units 104 should be powered off if the zone environmental units 104 are currently in a powered on state. Once the operational values are calculated, the output interface 112 may transmit a sequencing command to the plurality of zone environmental units 104 via the network 118. The sequencing command may be a command to power on or power off, where the sequencing command(s) depend(s) on the calculated operational value(s).

Figure 2:
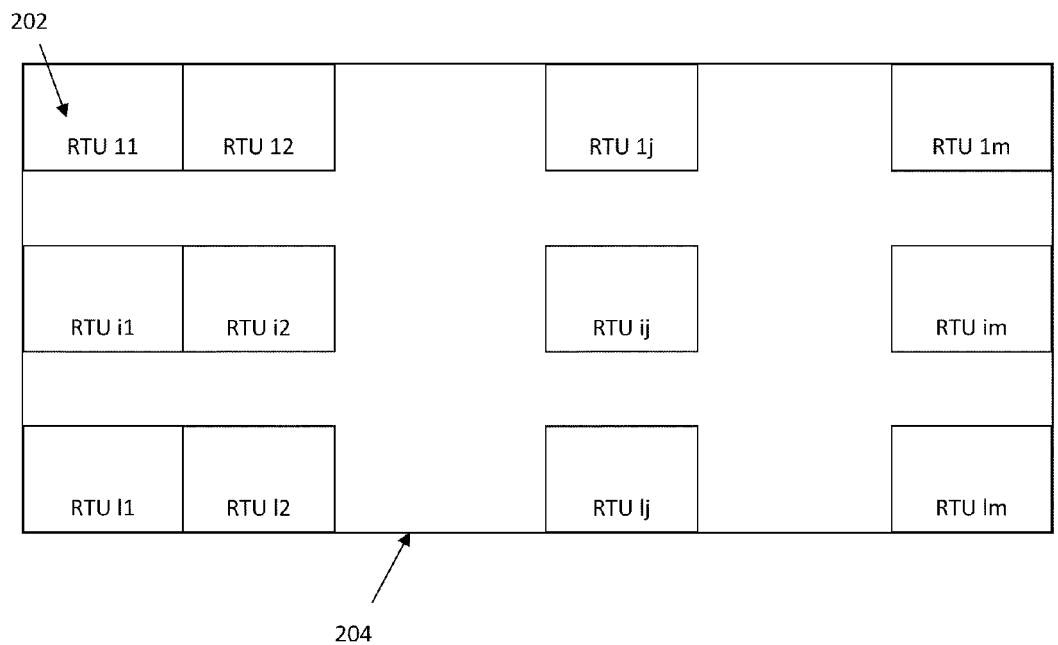
FIG. 2 is a schematic view of an environment having a plurality of environmental zones and corresponding environmental zone units.

An environment 200 is illustrated in FIG. 2. The environment 200 includes a plurality of zones 202 with dedicated, or associated, zone environmental units 104 (each zone and zone environmental unit is depicted as an RTU with respective column and row). As depicted, there are 1 (row)×m (column) environmental zone units. Each zone 202 may represent a specific region or specific boundary within an enclosed structure 204. The enclosed structure 204, for example, may include a commercial building and the like. The enclosed structure 204 may include multiple zone environmental units 104. The zone environmental units 104 may include HVAC units, such as roof top units, and the like. The zone environmental units 104 may include fans, compressors, heaters, exhaust fans, dampers, (not shown) and so forth.

The zone environmental units 104 may be associated with one specific zone 202 within the enclosed structure 204, or the zone environmental units 104 may be associated with multiple specific zones 202 within the enclosed structure 204. For example, the zone environmental unit 104 may be dedicated to cooling a first zone 202 only. Conversely, the zone environmental unit 104 may be dedicated to cooling the first zone 202 and a second zone 202.

The calculation module 116 may calculate or determine the operational values based upon the following equations. The ideal number of operating fans ($n_i$), where one zone environmental unit may include a fan, may be determined by the minimum total air flow rate required for the whole conditioning space $\dot{V}_t$ and the average RTU airflow rate, $\overline{V}_{RTU}$.

$$n_i \approx \frac{\dot{V}_t}{\overline{V}_{RTU}} \tag{1}$$

where $$\overline{V}_{RTU} = \frac{1}{l \times m} \sum_i^l \sum_j^m \dot{V}_{ij}, \tag{2}$$

and $\dot{V}_t$ is the maximum value for satisfying ventilation, heating, and cooling requirements for the enclosed structure 204. The current baseline is that during the enclosed structure's hours, all supply fans are operating:

$$\dot{V}_t = \text{MAX}(\dot{V}_v, \dot{V}_h, \dot{V}_c) \tag{3},$$

where $\dot{V}_v$ is the minimum airflow rate required by ventilation, $\dot{V}_h$ is the minimum flow by heating, and $\dot{V}_c$ is the minimum airflow rate by cooling. These parameters, or values, can be calculated by Equations (4), (5) and (6):

$$\dot{V}_v = R_p P_z + R_a A_z \tag{4}$$

$$\dot{V}_h = R_h \dot{Q}_h \tag{5}$$

$$\dot{V}_c = R_c \dot{Q}_c \tag{6};$$

where $R_p$ is the outdoor airflow rate required per person (e.g., 7.5 cfm/person for supermarket); $P_z$ is the zone population (e.g., 8 person/1000 ft² for supermarket); $R_a$ is the outdoor airflow rate required per unit area (e.g., 0.06 cfm/ft² for supermarket). For a supermarket application, $\dot{V}_v$ is about 15 cfm/person or 0.12 cfm/ft²; $R_h$ is the supply airflow rate required per unit ton of heating load (about 200 cfm/ton for supermarket); $R_c$ is the supply airflow rate required per unit ton of cooling load (about 340 cfm/ton for supermarket); $\dot{Q}_h$ is the instantaneous heating load; and $\dot{Q}_c$ is the instantaneous cooling load. $\dot{Q}_h$ and $\dot{Q}_c$ can be calculated by:

$$\dot{Q}_h = k_{env}(T_b - T_{amb}) \quad (7)$$

$$\dot{Q}_c = k_{env}[T_{amb} - T_b - (T_{sp,c} - T_{sp,h})] \quad (8)$$

where $k_{env}$ is the enclosed structure's 204 envelop load coefficient; $T_{amb}$ is the ambient temperature; $T_b$ is the balance temperature; $T_{sp,h}$ is the zone heating set point; and $T_{sp,h}$ is the zone cooling set point.

Each zone environmental unit may include multiple mode settings. For example, the zone environmental unit may have a cool mode for cooling periods, a heating mode for heating periods, economy, or economizer, mode for energy saving periods, and so forth. The locations of operating fans within the enclosed structure 204 may be determined by: Calculating the temperature offsets for each zone from its set points:

$$\Delta_{ij} = \begin{cases} T_z - T_{sp,c} & \text{for cooling mode} \\ T_{sp,h} - T_z & \text{for heating mode.} \end{cases} \quad (9)$$

Start the fans whose $\Delta T_{ij}$ belongs to the top $n_i$ and if
1. $\Delta t_{off,ij} > \Delta t_{of,min}$ (e.g., 5 mins) and
2. $\Delta T_{ij} > \Delta T_{min}$ (e.g., -2 F)

Start the fans whose $\Delta T_{ij}$ does not belong to the top $n_i$ but if
1. $\Delta T_{ij} > \Delta T_{max}$ (3 F) or
2. $\Delta t_{off,ij} > \Delta t_{off,max}$ (e.g., 2 hrs) and $\Delta T_{ij} > \Delta T_{min}$ (e.g., -2 F).

The zone environmental unit's 104 fan may be stopped if:
1. $\Delta T_{ij} < \Delta T_{min}$ (e.g., -2 F) or
2. $\Delta t_{on,ij} > \Delta t_{on,max}$ (e.g., 30 mins) and $\Delta T_{ij} < \Delta T_{max}$ (3 F)−1 F.

The compressor operation, where each zone environmental unit 104 may include a compressor, may be determined by:

First, define the operating mode as in Equation (10):

$$\text{mode} = \begin{cases} \text{cooling} & \text{if } \dot{V}_t = \dot{V}_c \\ \text{economizing} & \text{if } \dot{V}_t = \dot{V}_v \\ \text{heating} & \text{if } \dot{V}_t = \dot{V}_h \end{cases} \quad (10)$$

Start all the compressor(s) of the zone environmental unit(s) 104 if mode=cooling and
1. FanStatus='on' and
2. $\Delta t_{off,ij} > \Delta t_{off,min}$ (e.g., 5 mins)
3. One $\Delta T_{ij} > \Delta T_{min}$ (e.g., -2 F).

The adaptive device control 102 may determine that each individual compressor should stage off one-by-one if $\Delta T_{ij}$ drops at a rate higher than $k_T$ (e.g., 2 F in 10 minutes) and maintain the supply air dry-bulb temperature low than $T_{sp,s}$ (e.g., 55 F) if the dewpoint of the outdoor air is higher than (e.g., $T_{sp,s}$ (e.g., 55 F).

The heater operation, where each zone environmental unit 104 may include a heater, may be determined by:

Start all the heater(s) of the RTU if mode=heating and
1. FanStatus='on' and
2. $\Delta t_{off,ij} > \Delta t_{off,min}$ (e.g., 5 mins)
3. $\Delta T_{ij} > \Delta T_{min}$ (e.g., -2 F).

The adaptive control device 102 may determine that individual heaters may be staged off one-by-one if $\Delta T_{ij}$ drops at a rate higher than $k_T$ (e.g., 2 F in 10 minutes).

The exhaust fan operation, where each zone operational unit 204 may include an exhaust fan, may be determined by:

The number of exhaust fans to be operated should be equal to the actual number of operating supply fans ($n_a$). Define a parameter, $w_{ef,ij}$, to quantify the priority of the exhaust fan associated with $RTU_{ij}$. Update equation (11) every time the following conditions are checked:

1. If the supply fan of $RTU_{ij}$ is off, then $\Delta w_{ef,ij}=1$, otherwise, $\Delta w_{ef,ij}=0$
2. If $\Delta T_{ij} \geq Q$ F, then $\Delta w_{ef,ij} = \Delta T_{ij/}[\Delta T_{max}((\alpha[F])+\beta[F])]$, otherwise $\Delta w_{ef,ij} = \Delta T_{ij/}[\Delta T_{min}((\alpha[F])+\delta[F])]$ $$w_{ef,ij} = w_{ef,ij} + \Delta w_{ef,ij} \quad (11)$$

In a typical design, the variable Q=0, the variable $\alpha$=3, the variable $\beta$=2, and the variable $\delta$=1. The adaptive control device 102 may determine that exhaust fans whose $w_{ef,ij}$ belongs to the top $n_a$ may need to powered on or started.

The damper operation, where each zone environmental unit 204 may be associated with a damper, may be determined by:

The outdoor damper position should be maintained at its possible minimum position (can be up to 100%):

$$\beta_{min} = \frac{\dot{V}_v}{\dot{V}_t}$$

The current baseline is during the enclosed structure's 204 hours, the outdoor damper is maintained at a minimum position $\beta_{min,b}$ (10-30% according to test and balance) when the economizer is not enabled. Ideally, if the test and balance practice are accurate, $\beta_{min} \geq \beta_{min,b}$, the same amount of outdoor air is delivered to the zone 202, so no additional ventilation load is introduced from the whole enclosed structure perspective.

If mode=cooling, modulate the damper position to meet $\dot{V}_o = \dot{V}_v$ in terms of the whole enclosed structure.

If mode=economizing, modulate the damper position=100%.

If mode=heating, modulate the damper position to meet $\dot{V}_o = \dot{V}_v$ in terms of the whole enclosed structure 204.

Generally, any of the functions or equations described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the adaptive control device 102 of FIG. 1 can be wired, wireless, or some combination thereof. In the case of a software implementation, for instance, the module represents executable instructions that perform specified tasks when executed on a processor, such as the processor 106 with the adaptive control device 102 of FIG. 1. The program code can be stored in one or more device-readable storage media, an example of which is the memory 108 associated with the adaptive control device 102 of FIG. 1.

Example Procedures

The following discussion describes procedures that may be implemented in an adaptive control device providing control functionality. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1. The features of techniques described below are platform-independent, meaning that the techniques may be implemented on a variety of control device platforms having a variety of processors.

Figure 3:
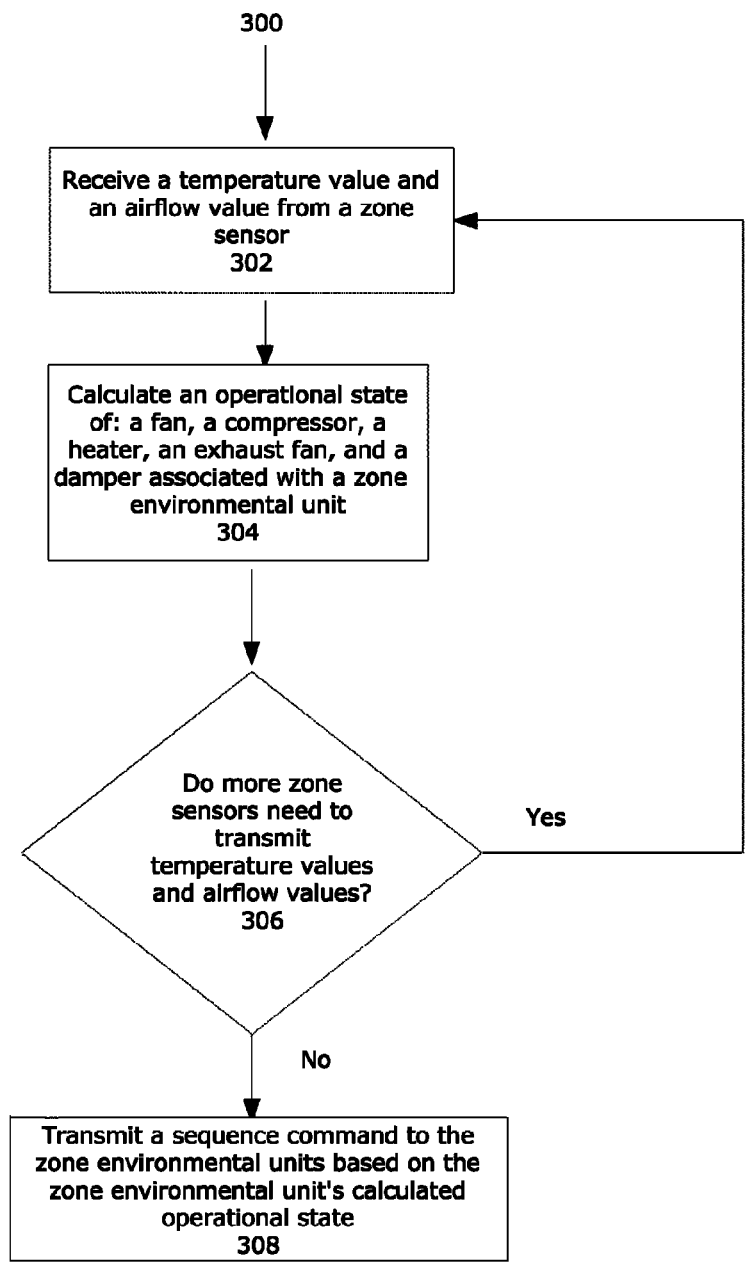
FIG. 3 is a flow diagram illustrating a procedure in an exemplary implementation of the adaptive control device of FIG. 1.

FIG. 3 depicts a procedure 300 in an example implementation in which an adaptive control device 102 provides sequencing commands to multiple zone environmental units. As shown in FIG. 3, the adaptive control device receives a plurality of temperature values and a plurality of airflow values from a zone sensor 114 (Block 302). The temperature values and the airflow values may represent a temperature reading and an airflow reading from a specific zone(s) 202.

Upon receiving the temperature values and airflow values, the calculation module 116 may calculate an operational value or operational state of a zone environmental unit's fan compressor, heater, exhaust fan, and damper (Block 304). The adaptive control device 102 may then determine whether more zone sensors 114 need to transmit temperature values and airflow values (Decision Block 306) to the adaptive control device 102. If more temperature values and airflow values need to be transmitted ("YES" from Decision Block 306), the adaptive control device may receive these temperature values and airflow values upon/or after transmission (Block 302). Otherwise ("NO" from Decision Block 308), the adaptive control device 102 may transmit sequence commands to the zone environmental units 104 for sequencing the operation of each zone environmental unit's 104 fan, compressor, heater, exhaust fan, and damper.

Although techniques to transmit multiple sequencing commands to multiple zone environmental units have been described in language specific to structural features and/or methodological acts, it is to be understood that the appended claims are not necessarily limited to the specific features or acts described. Rather, the specific features and acts are disclosed as exemplary forms of implementing the claimed devices and techniques.

What is claimed is:

1. A method for controlling a conditioning space including a plurality of zones via a plurality of zone environmental units comprising:
   receiving a plurality of temperature values and a plurality of airflow values, the plurality of temperature values and the plurality of airflow values associated with the plurality of zones;
   determining a minimum number of operating supply fans based upon the plurality of airflow values;
   operating a first group of supply fans comprising the minimum number of supply fans, each one of the first group of supply fans having a characteristic time offset difference greater than a minimum time offset difference and a characteristic temperature difference greater than a minimum temperature difference; and
   operating a second group of supply fans, each one of the second group of supply fans having at least one of (A) a characteristic temperature difference greater than a maximum temperature difference or (B) a characteristic time offset difference greater than a maximum time offset difference and a characteristic temperature difference greater than a minimum temperature difference.

2. The method of claim 1, further comprising ceasing operation of the first group of supply fans when at least one of (A) the characteristic temperature difference is less than the minimum temperature difference or (B) the characteristic time offset difference is greater than a maximum time offset difference and the characteristic temperature difference is less than a maximum temperature difference.

3. The method of claim 1, further comprising operating a plurality of compressors associated with the first group of supply fans and the second group of supply fans, each one of the plurality of compressors having a characteristic time offset difference greater than a minimum time offset difference and a characteristic temperature difference greater than a minimum temperature difference.

4. The method of claim 1, further comprising operating a plurality of heaters associated with the first group of supply fans and the second group of supply fans, each one of the plurality of heaters having a characteristic time offset difference greater than a minimum time offset difference and a characteristic temperature difference greater than a minimum temperature difference.

5. The method of claim 1, wherein the plurality of zone environmental units comprise a plurality of rooftop units.

6. The method of claim 1, wherein the plurality of zones comprise a plurality of regions in an enclosed structure.

7. An adaptive control device for controlling a conditioning space including a plurality of zones comprising:
   an input interface operable to receive a plurality of temperature values and a plurality of airflow values, the plurality of temperature values and the plurality of air flow values associated with the plurality of zones;
   a memory operable to store one or more modules;
   a processor operable to execute the one or more modules to cause the processor to:
      determine a minimum number of operating supply fans based upon the plurality of airflow values;
      operate a first group of supply fans comprising the minimum number of supply fans, each one of the first group of supply fans having a characteristic time offset difference greater than a minimum time offset difference and a characteristic temperature difference greater than a minimum temperature difference; and
      operate a second group of supply fans, each one of the second group of supply fans having at least one of (A) a characteristic temperature difference greater than a maximum temperature difference or (B) a characteristic time offset difference greater than a maximum time offset difference and a characteristic temperature difference greater than a minimum temperature difference;
   an output interface operable to transit a plurality of sequencing commands to a plurality of zone environmental units associated with the first group of supply fans and the second group of supply fans for operating the first group of supply fans and the second group of supply fans.

8. The adaptive control device of claim 7, wherein the processor is further operable to execute the one or more modules to cause the processor to cease operation of the first group of supply fans when at least one of (A) the characteristic temperature difference is less than the minimum temperature difference or (B) the characteristic time offset difference is greater than a maximum time offset difference and the characteristic temperature difference is less than a maximum temperature difference.

9. The adaptive control device of claim 7, wherein the processor is further operable to execute the one or more modules to cause the processor to operate a plurality of heaters associated with the first group of supply fans and the second group of supply fans, each one of the plurality of heaters having a characteristic time offset difference greater than a minimum time offset difference and a characteristic temperature difference greater than a minimum temperature difference.

10. The adaptive control device of claim 7, wherein the processor is further operable to execute the one or more modules to cause the processor to operate a plurality of compressors associated with the first group of supply fans and the second group of supply fans, each one of the plurality of compressors having a characteristic time offset difference greater than a minimum time offset difference and a characteristic temperature difference greater than a minimum temperature difference.

11. The adaptive control device of claim 7, wherein the plurality of zone environmental units comprise a plurality of rooftop units.

12. The adaptive control device of claim 7, wherein the plurality of zones comprise a plurality of regions in an enclosed structure.

13. A method comprising:
receiving a plurality of temperature values and a plurality of airflow values, the plurality of temperature values and the plurality of airflow values associated with a plurality of zones within a conditioning space;
determining a minimum number of operating supply fans based upon the plurality of airflow values;
operating a first group of supply fans comprising the minimum number of supply fans, each one of the first group of supply fans having a characteristic time offset difference greater than a minimum time offset difference and a characteristic temperature difference greater than a minimum temperature difference;
operating a second group of supply fans, each one of the second group of supply fans having at least one of (A) a characteristic temperature difference greater than a maximum temperature difference or (B) a characteristic time offset difference greater than a maximum time offset difference and a characteristic temperature difference greater than a minimum temperature difference;
determining a mode of operation for a zone environmental unit associated with the first group of supply fans and the second group of supply fans;
operating a plurality of compressors associated with the first group of supply fans and the second group of supply fans when the mode of operation is cooling, each one of the plurality of compressors having a characteristic time offset difference greater than a minimum time offset difference and a characteristic temperature difference greater than a minimum temperature difference when the mode of operation is cooling; and
operating a plurality of heaters associated with the first group of supply fans and the second group of supply fans when the mode of operation is heating, each one of the plurality of heaters having a characteristic time offset difference greater than a minimum time offset difference and a characteristic temperature difference greater than a minimum temperature difference when the mode of operation is heating.

14. The method as recited in claim 13, further comprising ceasing operation of the first group of supply fans when at least one of (A) the characteristic temperature difference is less than the minimum temperature difference or (B) the characteristic time offset difference is greater than a maximum time offset difference and the characteristic temperature difference is less than a maximum temperature difference.

* * * * *